(12) United States Patent
Brice et al.

(10) Patent No.: US 8,389,072 B2
(45) Date of Patent: Mar. 5, 2013

(54) SYSTEM, METHOD, AND APPARATUS FOR VARIABLE HARDNESS GRADIENT ARMOR ALLOYS

(75) Inventors: Craig A. Brice, Keller, TX (US); Brian T. Rosenberger, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1563 days.

(21) Appl. No.: 11/526,787

(22) Filed: Sep. 25, 2006

(65) Prior Publication Data

US 2010/0080935 A1 Apr. 1, 2010

Related U.S. Application Data

(63) Continuation-in-part of application No. 10/975,272, filed on Oct. 28, 2004, now abandoned.

(51) Int. Cl.
*C23C 14/14* (2006.01)
(52) U.S. Cl. .......... 427/597; 148/538; 148/220
(58) Field of Classification Search ............. 148/222, 148/538; 89/36.02; 264/603; 427/597
See application file for complete search history.

(56) References Cited

U.S. PATENT DOCUMENTS

| | | | |
|---|---|---|---|
| 4,902,359 A * | 2/1990 | Takeuchi et al. ............ | 148/222 |
| 5,152,960 A | 10/1992 | Yuki et al. | |
| 5,235,895 A | 8/1993 | Vanark et al. | |
| 5,252,150 A | 10/1993 | Yuki et al. | |
| 5,320,686 A | 6/1994 | Johansson et al. | |
| 5,483,864 A | 1/1996 | Vanark et al. | |
| 5,738,817 A * | 4/1998 | Danforth et al. ............ | 264/603 |
| 5,837,960 A | 11/1998 | Lewis et al. | |
| 6,046,426 A | 4/2000 | Jeantette et al. | |
| 6,530,998 B1 | 3/2003 | Oofune | |
| 6,945,306 B2 | 9/2005 | Duncan et al. | |

OTHER PUBLICATIONS

Pieters, R., et al., Particle Erosion Resistance of Laser Nitrided Ti-6A1-4V, Surface Engineering, Institute of Materials, London, GB, vol. 17, No. 2, Jan. 2001, pp. 159-62, ISSN: 0267-0844.
Gazanion, F., et al, Improvement of Abrasive Wear REsistance of Titanium by Laser Gas Alloying in Nitrogen-Air Atmosphere, Canadian Metallurgical Quarterly, vol. 42, No. 2, Apr. 2003, pp. 235-244, SP009109449.
Bonss, S., Laser Gas Alloying of Titanium—New Possibilities for Severe Wear Loaded Components in Aerospace and Medicine, Progress in Heat Treatment and Surface Engineering, Jun. 2000, pp. 311-19, XP009109451.
Pieters, R.R.G.M., et al., TiN Formed by Laser Gas Alloying (LGA) of Ti-6A1-4V, Surface Engineering: Science and Technology I, Mar. 1999, pp. 415-428, XP009109452.
Hu, C., et al., Analysis of the Phases Developed by Laser Nitriding Ti-6A1-4V Alloys, ACTA Materialia, Elsevier, Oxford, GB, vol. 45, No. 10, Jan. 1997, pp. 5311-4322, XP009109459, ISSN: 1359-6454.
Office Action dated Mar. 3, 2010, for co-pending U.S. Appl. No. 11/781,463, 6 pages.

* cited by examiner

*Primary Examiner* — Weiping Zhu
(74) *Attorney, Agent, or Firm* — Bracewell & Giuliani LLP (57) ABSTRACT

A variable hardness gradient armor alloy is produced with a liquid-state reaction between a metallic molten pool and a gaseous atmosphere having a small fraction of reactive gas. The content of the reactant gas is varied as the armor is fabricated in order to vary the properties of the resultant material across its thickness and typically include, for example, a hardened outer or initial layer for impact resistance, and at least one inner layer having a lower hardness than the outer layer but greater energy absorption.

16 Claims, 8 Drawing Sheets

SYSTEM, METHOD, AND APPARATUS FOR VARIABLE HARDNESS GRADIENT ARMOR ALLOYS

This continuation-in-part patent application is based on and claims priority to U.S. patent application Ser. No. 10/975,272, filed Oct. 28, 2004 now abandoned, entitled, Nitrogen-Modified Titanium and Method of Producing Same, and is incorporated herein by reference.

BACKGROUND OF THE INVENTION

1. Technical Field

The present invention relates in general to forming armor from metal alloys and, in particular, to a system, method, and apparatus for armor alloys having a gradient of variable hardness across its thickness.

2. Description of the Related Art

Many metal objects are produced by thermomechanical processes including casting, rolling, stamping, forging, extrusion, machining, and joining operations. Multiple steps are required to produce a finished article. These conventional operations often require the use of heavy equipment, molds, tools, dies, etc. For example, a typical process sequence required to form a small cylindrical pressure vessel might include casting an ingot, heat treating and working the casting to homogenize it by forging, extrusion, or both, machining a hollow cylinder and separate end caps from the worked ingot and, finally, welding the end caps to the cylinder.

Conventional production methods are subtractive in nature in that material is removed from a starting block of material to produce a more complex shape. Subtractive machining methods are deficient in many respects. Large portions of the starting material are reduced to waste in the form of metal cuttings and the like. These methods also produce waste materials such as oils and solvents that must be further processed for purposes of reuse or disposal. Even the articles produced are contaminated with cutting fluids and metal chips. The production of such articles also requires cutting tools, which wear and must be periodically reconditioned and ultimately replaced. Moreover, fixtures for use in manufacturing must be designed, fabricated, and manipulated during production.

Machining is even more difficult when a part has an unusual shape or has internal features. Choosing the most appropriate machining operations and the sequence of such operations requires a high degree of experience. A number of different machines are needed to provide capability to perform the variety of operations, which are often required to produce a single article. In addition, sophisticated machine tools require a significant capital investment and occupy a large amount of space. In contrast, using the present invention instead of subtractive machining provides improved solutions to these issues and overcomes many disadvantages.

Another difficulty with conventional machining techniques is that many objects must be produced by machining a number of parts and then joining them together. Separately producing parts and then joining them requires close-tolerance machining of the complementary parts, provision of fastening means (e.g., threaded connections) and welding components together. These operations involve a significant portion of the cost of producing an article as they require time for design and production as well as apparatus for performing them.

Titanium has been used extensively in aerospace and other manufacturing applications due to its high strength-to-weight ratio. To increase the usefulness of titanium, various titanium alloys have been produced, many being tailored to provide desired characteristics. However, the equilibrium solute levels (as measured in weight-percent) in conventionally processed titanium alloys are below that which maximizes the beneficial effect of the solute.

For example, in concentrations over 500 ppm, nitrogen is typically considered a contaminant in titanium alloys. At levels higher than 500 ppm, the tensile strength increases greatly with a corresponding drop in tensile ductility. Additionally, solidification cracking can be a serious problem at high nitrogen levels. It is this embrittling effect that prohibits the use of nitrogen as a significant alloying agent.

Titanium alloys typically exhibit low wear resistance due to their low hardness. Under certain circumstances, titanium also can be subject to chemical corrosion and/or thermal oxidation. Prior art methods for increasing the hardness of titanium alloys have been limited to surface modification techniques. For example, a hard face coating is a discrete surface layer applied to a substrate and is subject to delamination. Current methods are also subject to macro and micro cracking of the surface-hardened layer. For example, U.S. Pat. Nos. 5,252,150 and 5,152,960 disclose titanium-aluminum-nitrogen alloys. These patents disclose an alloy that is formed through a solid-state reaction of titanium in a heated nitrogen atmosphere. The alloy is formed in a melt with aluminum to create the final alloy product.

Rapid solidification processes (RSP) also can be used to increase the amount of solute levels in alloys. In these processes, a rapid quenching is used in freezing the alloy from a molten state so that the solutes remain in desired phases. After quenching, diffusion may allow for dispersion throughout the material and agglomeration at nucleation sites, which further improves the desired characteristics of the alloy. While this type of process is widely used, the resulting product is typically in powder, flake, or ribbon forms, which are unsuitable for manufacturing applications requiring material in bulk form.

In one type of application, typical armor systems contain various layers of material that have different physical and mechanical characteristics. Usually, the top or outermost layer (i.e., strike face) requires a material having high hardness (although it is quite brittle) for blunting and fragmenting the penetrator tips of projectiles, while the bottom or inner layer is ductile to allow for energy absorption and capture. For example, dual hardness armor steel is a roll bonded product containing one layer of high hardness steel and one layer of softer, more compliant steel. Although this is an effective product, the use of steel is too heavy for certain applications (e.g., aircraft). Thus, an improved metal alloy and process for producing the same, such as direct manufacturing to create a gradient layer of varying hardness in lightweight materials (e.g., titanium), would be desirable for many practical applications.

SUMMARY OF THE INVENTION

The present invention comprises a system, method, and apparatus for variable hardness gradient armor alloys. The armor is produced via a liquid-state reaction between a metallic molten pool and a gaseous atmosphere having a small fraction of reactive gas. The content of the reactant gas is varied as the armor is fabricated in order to vary the hardness of the resultant material. Consequently, the properties of such alloys vary across their thickness and typically include, for example, a hardened outer or initial layer for impact resistance, and at least one inner layer having a lower hardness than the outer layer but greater energy absorption. A direct manufacturing technique involving rapid solidification processing is used rather than conventional casting techniques that require bulk melting of solid-state materials.

By utilizing rapid solidification techniques, the solubility levels of the metallic materials can be increased resulting in alloys with unique mechanical and physical properties that are unattainable through conventional processing methods. For example, laser deposition techniques may be used on commercially pure metals in atmospheres having various amounts of inert and reactive gases.

In one embodiment, a layered armor with one or more outer layers having high hardness are deposited directly onto a more ductile material, which may be accomplished through deposition in a controlled atmosphere containing, e.g., nitrogen. As the level of the reactant gas is changed, the amount of composition (e.g., metallic nitrides) in the structure changes. The hardness of the material is directly related to the amount of nitrides and nitrogen in solid solution contained in the structure. By controlling this process, a structure can be created that has high ductility on one side and high hardness on the other, which is an ideal candidate for an armor material. The invention may be implemented with titanium and other lightweight materials, thus making available applications in areas where low density is a factor.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

The present invention is directed to a system, method, and apparatus for variable hardness gradient armor alloys. In one embodiment, the armor is well suited for applications that require a combination of high strength, light weight, and low density. To enable formation of the armor, one method of producing the alloys utilizes a solid freeform fabrication (SFF), or direct deposition, device to achieve rapid cooling and solidification while forming a bulk part.

Figure 1:
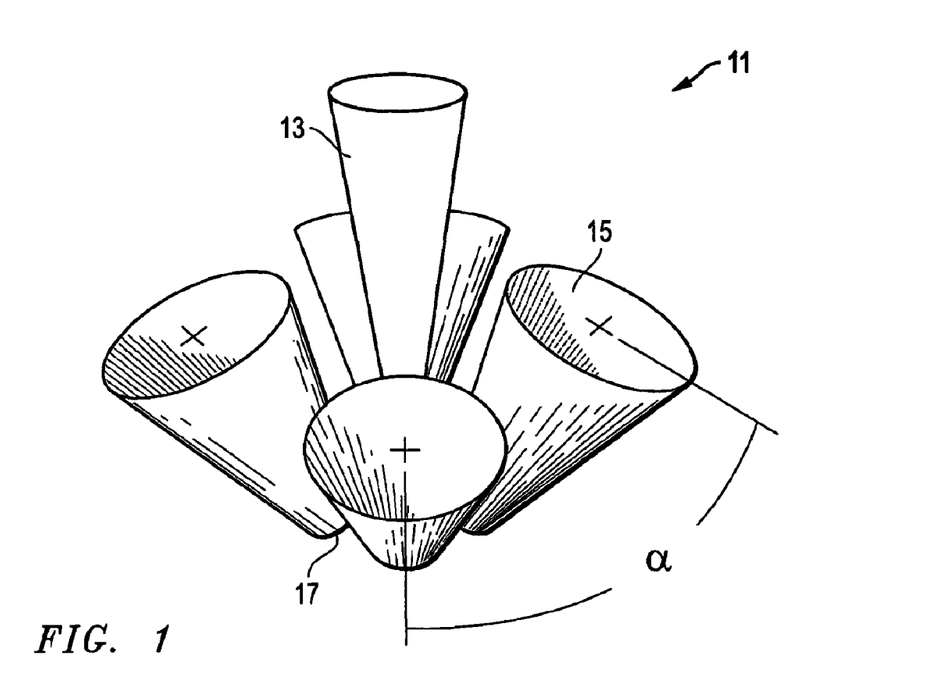
FIG. 1 is a schematic perspective view of one embodiment of a portion of a solid freeform fabrication device constructed in accordance with the present invention.

The alloys of the present invention utilize a rapid solidification process (RSP) to retain the desired metastable phases, and a method of direct manufacturing that results in rapid solidification is shown in the figures. FIG. 1 is a schematic, perspective view of a portion of a SFF device 11, such as is available from Optomec Design Company, Albuquerque, N. Mex., and sold under the trademark LENS™ (Laser Engineered Net Shaping).

Device 11 comprises a high energy density heat source, such as a laser beam 13. Other forms of heat sources may include, for example, electron beams and arcs, as illustrated at step 301 in FIG. 3. The laser beam 13 may be formed by various laser types and delivered to the desired location by fixed or fiber optics. Beam 13 acts as the heat source for melting a feedstock, such as a metallic powder or wire, for example. The feedstock may be simply positioned for alloying (e.g., on a platform), or delivered through one or more guide nozzle(s) 15 (four shown), as depicted at step 305 in FIG. 3. If nozzles are used, the feedstock exits the nozzles through an outlet 17 at the lower end of each nozzle.

Figure 3:
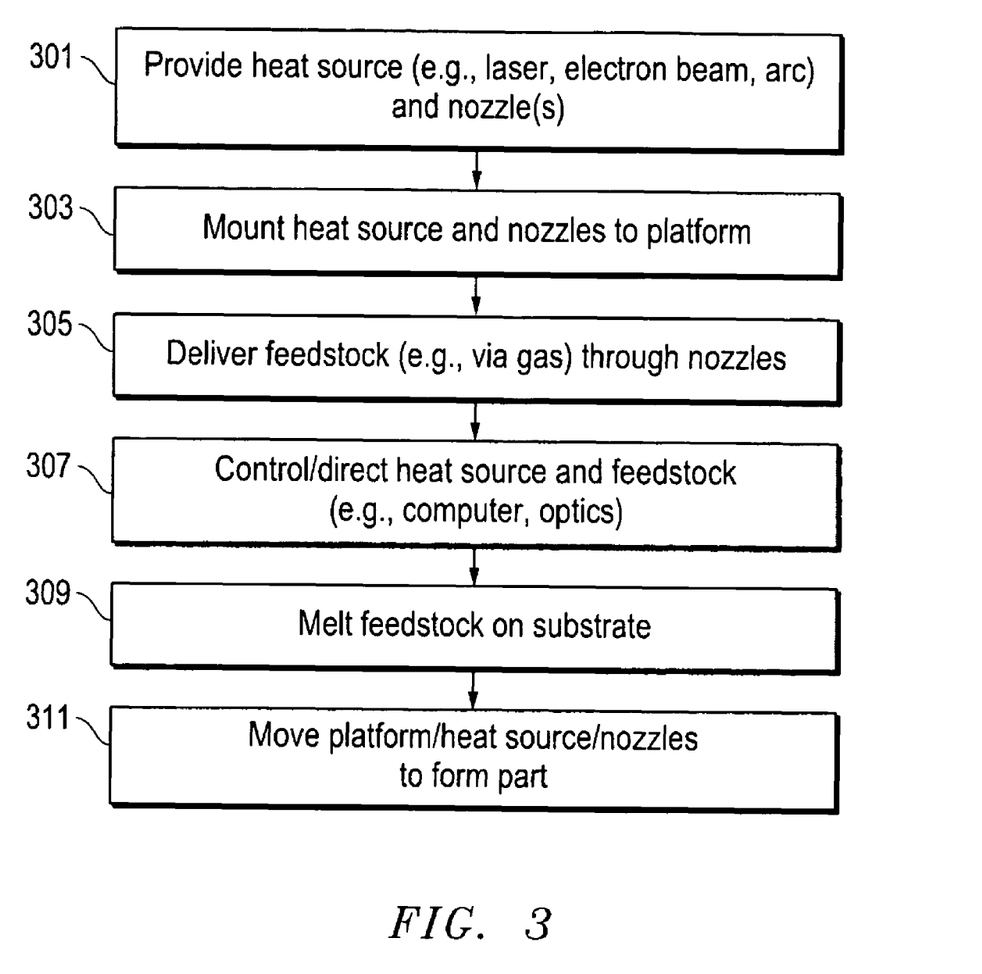
FIG. 3 is a high level flow diagram of one embodiment of a method constructed in accordance with the present invention.

In one embodiment, the controls for the heat source and nozzles are mounted to a movable platform, as depicted in step 303 in FIG. 3. In the laser embodiment, the controls may utilize optics to direct the laser beam 13. The platform also is computer-controlled to position the beam 13 and nozzles 15 in a desired location for each section or layer of the part being formed. These portions of the method are illustrated at step 307 in FIG. 3. In the illustrated embodiment, device 11 is shown as having four nozzles 15 located at 90° increments in an array having a selected radius from, and being centered on, beam 13. Though shown with four nozzles 15, device 11 may have more or fewer nozzles 15, and the nozzles 15 may be arranged in various orientations.

Figure 2:
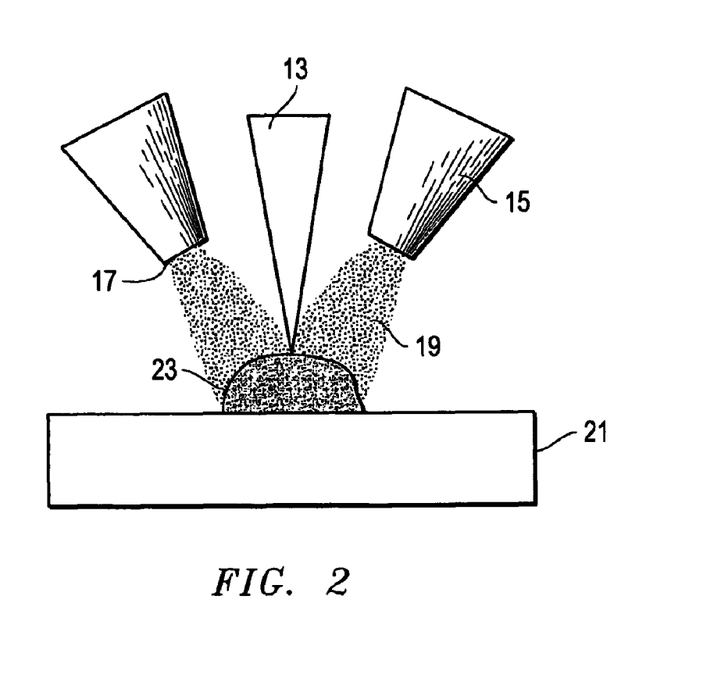
FIG. 2 is a schematic front view of the device of FIG. 1 during fabrication of a part, and is constructed in accordance with the present invention.

To form a part using the device 11, the metal or metallic alloy feedstock is presented, such as by delivery into and through the nozzles 15. As shown in FIG. 2, when e.g., the powdered metal 19 is used as the feedstock, the metallic powder is entrained in an inert gas, typically argon, for delivery via the nozzles (step 305, FIG. 3). The feedstock is carried out of the exit 17 of each nozzle 15 and directed at a point where the stream(s) of the metal 19 converge with the heat source. In one embodiment, the laser beam 13 melts the metal 19 (step 309, FIG. 3), forming a molten pool on the platform or substrate 21. The metal 19 is simultaneously exposed to a gaseous alloying element (e.g., nitrogen, oxygen, etc.). As one of or both the platform for the beam 13 and the nozzles 15 is/are moved (step 311, FIG. 3), the pool rapidly cools and solidifies as an alloy. When the heat source or beam 13 is moved away, a continuous line of deposited alloy 19 forms a portion of part 23. Device 11 is used to form adjacent, side-by-side layers to form the width of the part, and is used to form adjacent, stacked layers to create the height of part 23.

Figure 8:
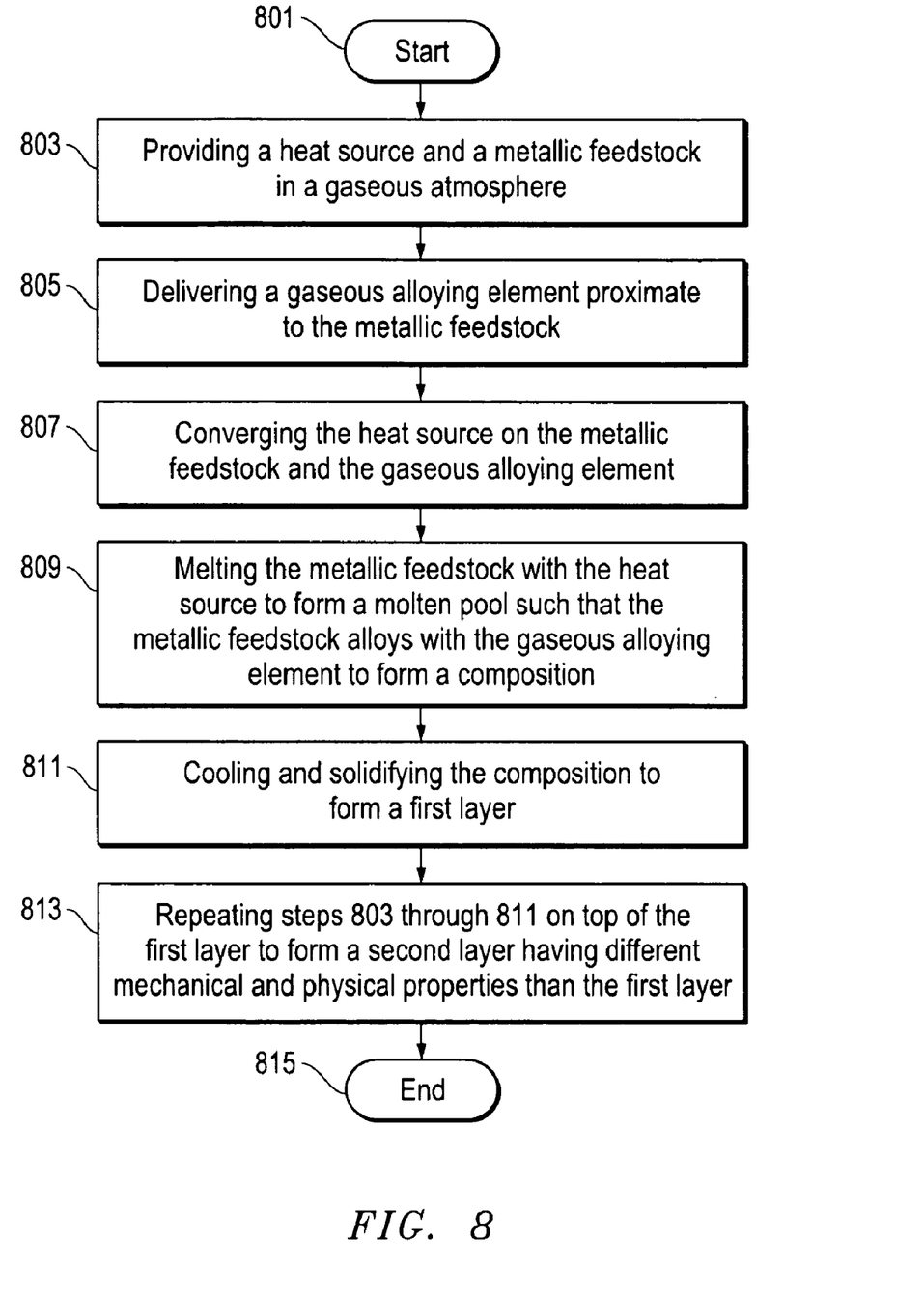
FIG. 8 is a high level flow diagram of another embodiment of a method constructed in accordance with the present invention.
Figure 9:
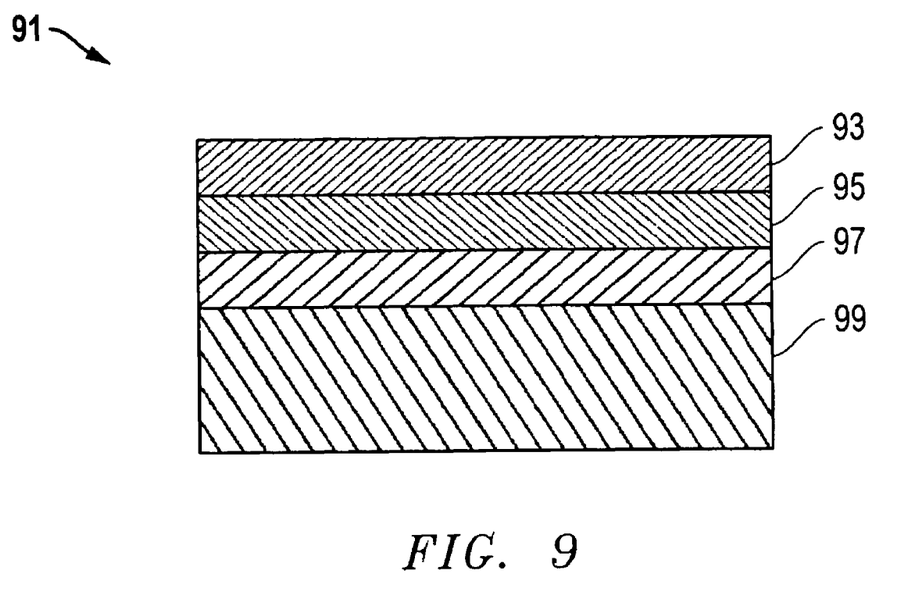
FIG. 9 is a sectional side view of one embodiment of armor constructed in accordance with the present invention.

Referring now to FIGS. 8 and 9, one embodiment of the invention comprises a system, method, and apparatus for variable hardness gradient armor alloys. The armor 91 (FIG. 9) is produced via a liquid-state reaction between a metallic molten pool and a gaseous atmosphere having a small fraction of reactive gas. The content of the reactant gas is varied as the armor is fabricated in order to vary the hardness of the resultant material.

The properties of the armor vary across its thickness and typically include, for example, a hardened outer or initial layer 93 for impact resistance, and at least one inner layer 95, 97 having a lower hardness than the outer layer 93 but greater energy absorption. In one embodiment, the one or more layers 93, 95, 97 (e.g., three shown) are fabricated on an unaltered base layer 99 of the foundation material (e.g., conventional titanium). However, other embodiments of the invention may comprise many more layers (e.g., 20 layers), each of which may have different mechanical and physical properties than the other layers. In addition, the foundation material and the metallic feedstock may comprise the same material.

By utilizing rapid solidification techniques, the solubility levels of the metallic materials can be increased resulting in alloys with unique mechanical and physical properties that are unattainable through conventional processing methods. For example, laser deposition techniques may be used on commercially pure metals in atmospheres having various amounts of inert and reactive gases.

In the embodiment of FIG. 9, the layered armor 91 comprises layers 93, 95, 97 having high hardness deposited directly onto the more ductile material 99, which may be accomplished through deposition in a controlled atmosphere containing, e.g., nitrogen. As the level of the reactant gas is changed, the amount of composition (e.g., metallic nitrides) in the structure changes. The hardness of the material is directly related to the amount of nitrides and nitrogen in solid solution contained in the structure. By controlling this process, a structure is formed that has high ductility on one side and high hardness on the other, which is an ideal candidate for armor material. The invention may be implemented with titanium and other lightweight materials, thus making available applications in areas where low density is a factor.

One embodiment of a method of the invention (FIG. 8) is used to form armor. The method starts as indicated at step 801, and comprises providing a heat source and a metallic feedstock in a gaseous atmosphere (step 803); delivering a gaseous alloying element proximate to the metallic feedstock (step 805); converging the heat source on the metallic feedstock and the gaseous alloying element (step 807); melting the metallic feedstock with the heat source to form a molten pool such that the metallic feedstock alloys with the gaseous alloying element to form a composition (step 809); cooling and solidifying the composition to form a first layer (step 811); and repeating steps 805 through 811 on top of the first layer to form a second layer having different mechanical and physical properties than the first layer (step 813), before ending as indicated at step 815.

In one experiment, five different argon/nitrogen atmospheric combinations were evaluated in addition to a baseline 100% Ar CP—Ti. Custom mixed bottles of argon and nitrogen were mixed with the following ratios (Ar/N$_2$): 96/4, 93/7, 90/10, 85/15, and 70/30. Cp-Ti specimens were then laser deposited in each gas composition. Prior to deposition, an amount of the desired composition was purged through the system to ensure a homogeneous mixture at the target concentration. Another amount of the desired composition was used to keep the chamber at operating pressure and as a carrier gas for the powder delivery system.

In this embodiment, heat treatments were performed on some test samples in order to examine microstructural stability and thermal effects. Microstructural characterization was carried out using optical and scanning electron microscopy. Under equilibrium conditions, the solidification sequence for compositions under 1.2% N, which corresponds to about 7% atmospheric nitrogen, is:

$$L \rightarrow L+\beta \rightarrow \beta \rightarrow \beta+\alpha \rightarrow \alpha+Ti_2N$$

And for equilibrium solidification at compositions greater than 1.9% N:

$$L \rightarrow L+\alpha \rightarrow \alpha+\beta \rightarrow \alpha \rightarrow \alpha+Ti_2N$$

This solidification behavior is likely valid under equilibrium conditions and therefore not necessarily valid for laser deposited structures (i.e., due to rapid solidification characteristics). Rapid solidification tends to increase solid solubilities, which effectively shifts the phase diagram towards the solute end, thus favoring metastable phase formation. However, microstructural analysis is consistent with the above solidification sequences, though the composition limits may be uncertain. In one embodiment, the Ti alloy contains a weight percentage of N of approximately 0.05% to 3.0%.

FIG. 4 shows a micrograph series for the 90/10 and 70/30 mixtures of Ar/N$_2$ for one embodiment. For the 90/10 mixture (FIGS. 4A, 4B, 4C), the macrostructure (FIG. 4A) is typical of what is seen in conventional Ti alloys (i.e., large prior $\beta$ grain boundaries with a martensitic $\alpha'$ lath basket weave structure). FIG. 4B shows a backscattered electron SEM image (BSEM) that reveals compositional contrast and indicates that Ti$_x$N$_y$ compounds might exist in the interlath regions. FIG. 4C shows the 90/10 composition after heat treatment for 1-hour at 1000° C. Here, the Ti$_x$N$_y$ particles are clearly seen pinning a grain boundaries in a recrystallized microstructure. The particle composition was verified using energy dispersive spectroscopy (EDS) to be Ti$_2$N.

Figure 4A:
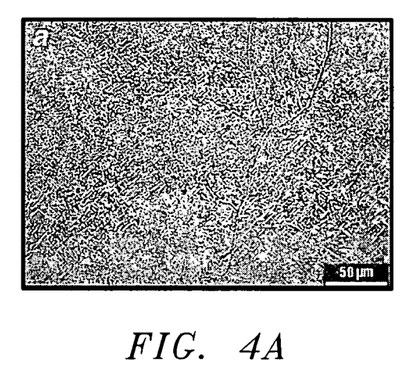
FIG. 4 is a series of optical and electron micrographs depicting various structures of one embodiment of a composition of matter constructed in accordance with the present invention.
Figure 4B:
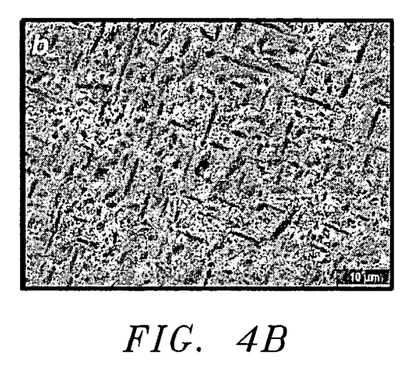
Figure 4C:
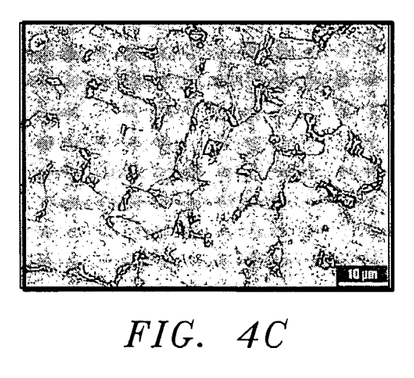
Figure 4D:
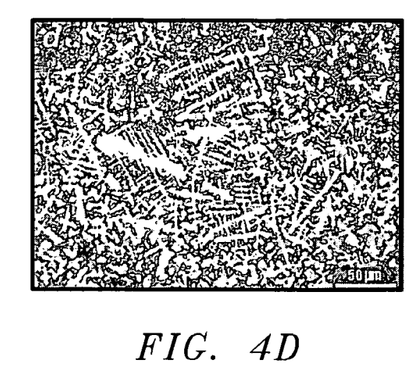
Figure 4E:
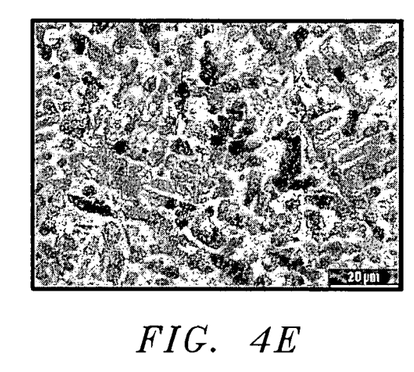
Figure 4F:
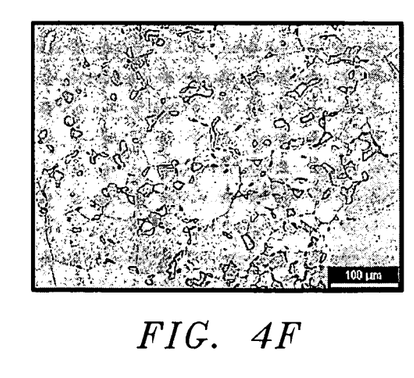

The 70/30 mixture (FIGS. 4D, 4E, 4F) has a macrostructure that is quite different from the 90/10 composition. FIG. 4D shows an optical micrograph of the as-deposited structure clearly showing dendritic formation of primary $\alpha$. Closer look via BSEM (FIG. 4E) shows that the interdendritic region likely contains the Ti$_2$N compound. FIG. 4F shows the 70/30 mixture after 1-hour heat treatment at 1150° C. Here again, the Ti$_2$N particles are clearly seen pinning the $\alpha$ grain boundaries though the size of the particles is much larger when compared to those seen in the 90/10 sample (note the micron bars).

Figure 5:
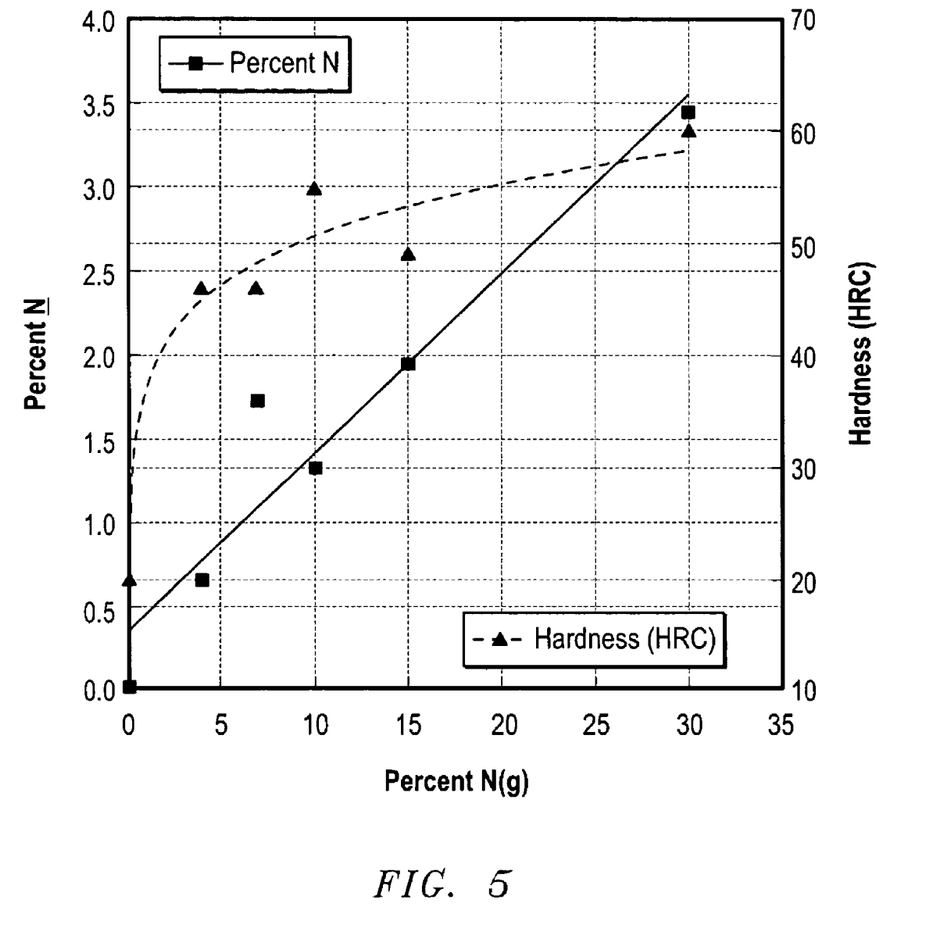
FIG. 5 is a plot of atmospheric nitrogen versus nitrogen absorbed and hardness in one embodiment of a composition of matter constructed in accordance with the present invention.
Figure 6A:
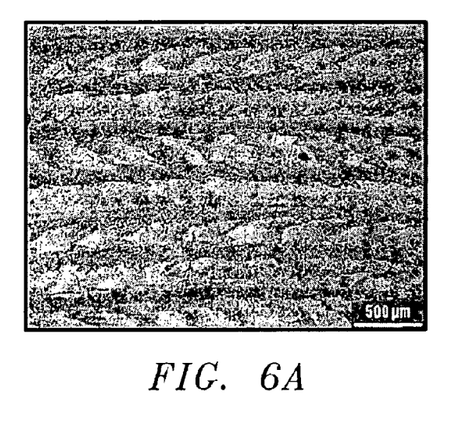
FIG. 6 is a series of optical micrographs depicting various structures of one embodiment of a composition of matter constructed in accordance with the present invention.
Figure 6B:
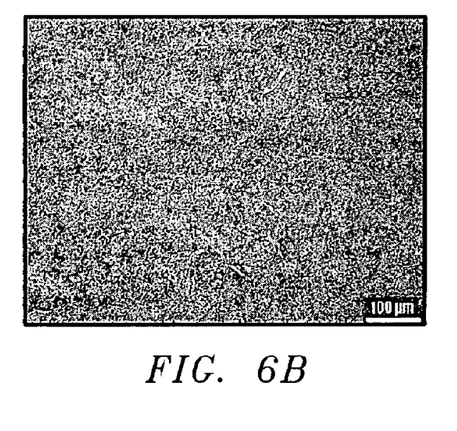
Figure 6C:
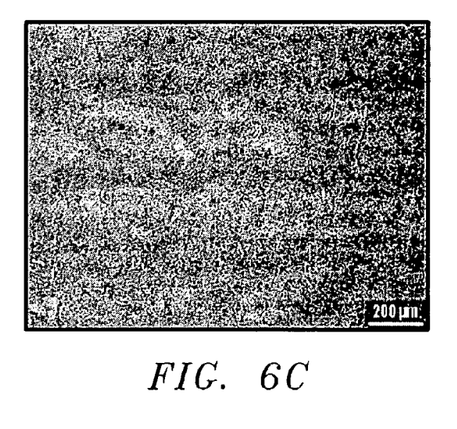
Figure 6D:
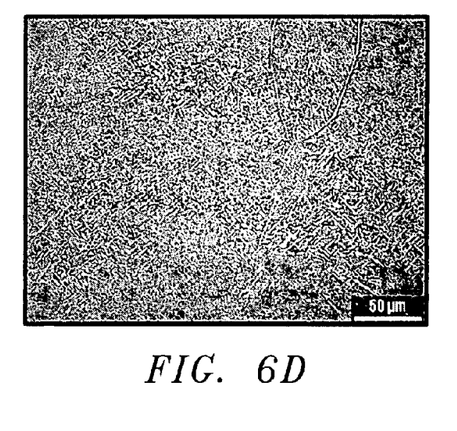
Figure 7A:
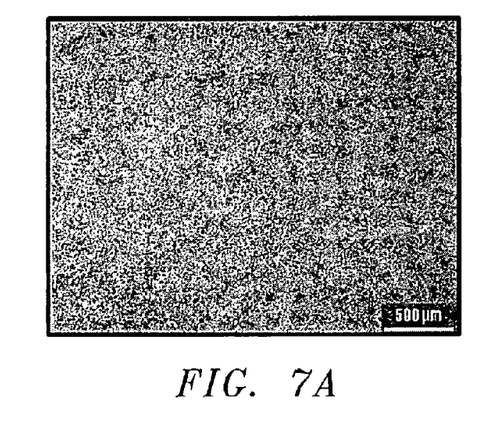
FIG. 7 is a series of optical micrographs depicting various structures of one embodiment of a composition of matter constructed in accordance with the present invention.
Figure 7B:
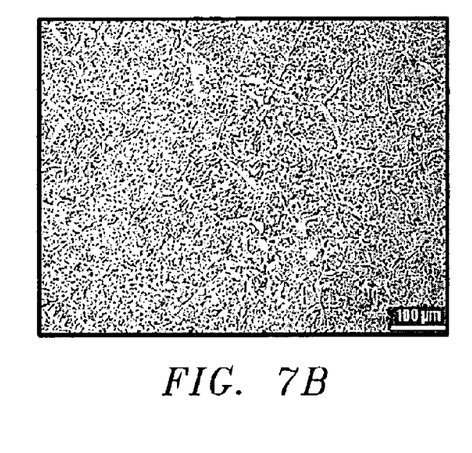
Figure 7C:
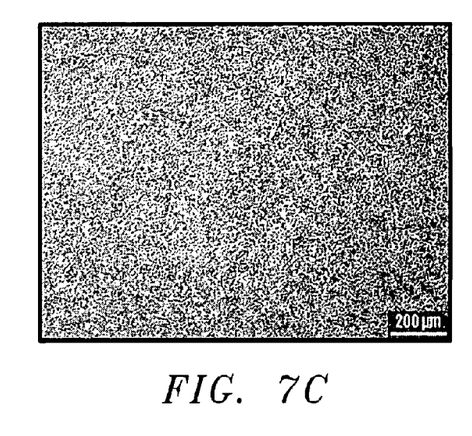
Figure 7D:
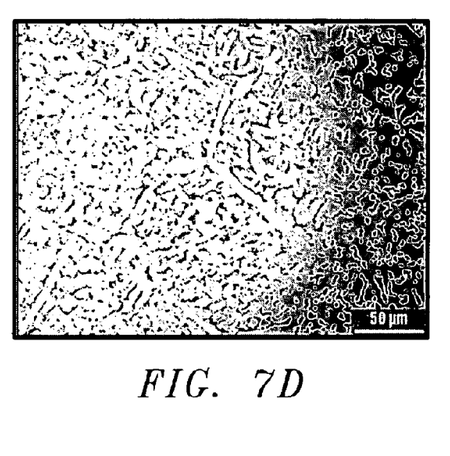

The chemistry results are shown in Table 1. Of interest here is the nearly linear relationship between atmospheric nitrogen and dissolved nitrogen in the as-deposited samples. This relationship is more clearly seen in FIG. 5, as are the plotted superficial hardness values. Here the relationship seems to follow a power-law relationship indicating that significant hardening benefits can be obtained at low concentrations while the effect diminishes at higher concentrations.

TABLE 1

| Element | CP—Ti | 4% N | 7% N | 10% N | 15% N | 30% N | Nominal | ASTM B348 |
|---|---|---|---|---|---|---|---|---|
| C | 0.0880% | 0.0980% | 0.0670% | 0.0870% | 0.0640% | 0.0910% | 0.0910% | 0.0800% |
| H | 0.0050% | 0.0018% | 0.0020% | 0.0012% | 0.0037% | 0.0038% | — | 0.0150% |
| N | 0.0200% | 0.6700% | 1.7300% | 1.3300% | 1.9400% | 3.4500% | 0.0080% | 0.0300% |
| O | 0.1700% | 0.1500% | 0.1440% | 0.1400% | 0.1470% | 0.1400% | 0.1250% | 0.1800% |

Table 2 shows results from mechanical testing of the control CP-Ti specimens and the 96/4 and 90/10 compositions. The samples above 10% suffered cracking that prevented them from being tested. A small amount of nitrogen (as little as 0.1%) may result in gains in ultimate tensile strength on the order of 60% (i.e., as high as 140 ksi), and gains in hardness on the order of 100% (up to 55 HRC). Essentially no ductility was found in any of the nitrogen-modified samples.

TABLE 2

| Comp. | ID | Test Log | Temp. | UTS | 0.2% YS | % E | % RA | Mod. | Hard. |
|---|---|---|---|---|---|---|---|---|---|
| 10% | N4 | — | — | — | — | — | — | — | 55 |
| 10% | N5 | 980791 | RT | 33.3 | — | — | — | 18.6 | 55 |
| 10% | N6 | 980792 | RT | 28.4 | — | — | — | 18.5 | 55 |
|  |  |  | AVG | 30.9 |  |  |  | 18.6 | 55.0 |
| 4% | N26 | 980796 | RT | 137.9 | — | — | — | 17.2 | 46 |
| 4% | N27 | 980797 | RT | 155.5 | — | — | — | 17.3 | 48 |
| 4% | N28 | 980789 | RT | 139 | — | — | — | 17 | 47 |
|  |  |  | AVG | 144.1 |  |  |  | 17.2 | 47.0 |
| CP | N21 | 980793 | RT | 88 | 76.7 | 6.5 | 9.5 | 16.7 | 100 (23) |
| CP | N23 | 980794 | RT | 88 | 74.6 | 23 | 31 | 16.7 | 97 (18) |
| CP | N24 | 980795 | RT | 81 | 73.2 | 5.5 | 13 | 16.7 | 98 (19) |
|  |  |  | AVG | 85.7 | 74.8 | 11.7 | 17.8 | 16.7 | 98.3 (20.0) |

FIGS. 6 and 7 show the effect of heat treatment on the 90/10 composition. FIGS. 6A-6D show a series of optical micrographs of the sample in the as-deposited condition. Here the layered deposition structure is clearly seen. This structure is likely due to local thermal variation resulting in small differences in the scale of the microstructural features. This inhomogeneity is detrimental to mechanical properties as it provides a path of least resistance for defects to propagate. The series of optical micrographs in FIGS. 7A-7D show the same sample after a β anneal heat treatment at 1000° C. Here the microstructure has recrystallized and eliminated the layered structure seen in the non-heat treated condition. This microstructure might lead to mechanical property improvement, namely ductility.

While the invention has been shown or described in only some of its forms, it should be apparent to those skilled in the art that it is not so limited, but is susceptible to various changes without departing from the scope of the invention.

The invention claimed is:

1. A method of forming armor, comprising:
   (a) providing a base material, a heat source, and a metallic feedstock in a gaseous atmosphere;
   (b) delivering a gaseous alloying element proximate to the metallic feedstock;
   (c) converging the heat source on the metallic feedstock and the gaseous alloying element;
   (d) melting the metallic feedstock with the heat source to form a molten pool on the base material, such that the metallic feedstock alloys only with the gaseous alloying element to form a composition on the base material; and
   (e) cooling and solidifying the composition to form a first layer directly on the base material, the first layer having different mechanical and physical properties than the base material, and the base material is not alloyed with the gaseous alloying element.

2. A method according to claim 1, wherein the base material has greater ductility than the first layer, and the first layer has higher hardness than the base material.

3. A method according to claim 1, further comprising repeating steps (b) through (e) on top of the first layer to form a second layer having different mechanical and physical properties than the first layer and the base material, such that the armor has at least three layers of material having different properties.

4. A method according to claim 3, wherein step (e) and the repeating step comprise forming the armor with adjacent, side-by-side layers to form a width of the part, and adjacent, stacked layers to form a height of the part.

5. A method according to claim 1, wherein the base material and the metallic feedstock are the same material.

6. A method according to claim 1, wherein the gaseous atmosphere is approximately 70 to 99.9% inert gas, and approximately 0.1% to 30% gaseous alloying element.

7. A method according to claim 1, wherein the gaseous alloying element is selected from the group consisting of nitrogen and oxygen.

8. A method according to claim 1, wherein the heat source is a laser that is directed by fiber optics.

9. A method according to claim 1, wherein the heat source is selected from the group consisting of an electron beam and an electron arc.

10. A method according to claim 1, further comprising the step of controlling the heat source with optics, the optics also being mounted to a movable platform, and wherein the movable platform is computer-controlled to position the heat source and the metallic feedstock in a desired location for multiple sections and layers of the armor being formed.

11. A method of forming armor, comprising:
   (a) providing a laser heat source, a movable platform having a foundation material, and a metallic feedstock in a gaseous atmosphere;
   (b) delivering a gaseous alloying element proximate to the metallic feedstock on the foundation material;
   (c) converging the laser heat source on the metallic feedstock and the gaseous alloying element;

(d) melting the metallic feedstock with the laser heat source to form a molten pool on the foundation material, such that the metallic feedstock alloys only with the gaseous alloying element to form a composition with the foundation material;

(e) moving the composition via the movable platform and the heat source relative to each other, such that the molten pool rapidly cools and solidifies to form a first layer of deposited alloy on the foundation material, and the foundation material is not alloyed with the gaseous alloying element; and (f) repeating steps (b) through (e) on top of the first layer to form a second layer having different mechanical and physical properties than the first layer.

12. A method according to claim 11, wherein the foundation material has greater ductility than the first layer, the first layer has greater ductility than the second layer, the second layer has higher hardness than the first layer, and the first layer has higher hardness than the foundation material.

13. A method according to claim 11, wherein the foundation material and the metallic feedstock are the same material.

14. A method according to claim 11, wherein the gaseous atmosphere is approximately 70 to 99.9% inert gas, and approximately 0.1% to 30% gaseous alloying element.

15. A method according to claim 11, wherein the gaseous alloying element is selected from the group consisting of nitrogen and oxygen.

16. A method according to claim 11, further comprising the step of controlling the laser heat source with optics, the optics also being mounted to the movable platform, and wherein the movable platform is computer-controlled to position the laser heat source and the metallic feedstock in a desired location for multiple sections and layers of the armor.

* * * * *